(12) United States Patent
Zhang et al.

(10) Patent No.: US 9,206,316 B2
(45) Date of Patent: Dec. 8, 2015

(54) THERMOPLASTIC ELASTOMER COMPOSITIONS

(71) Applicant: E I DU PONT DE NEMOURS AND COMPANY, Wilmington, DE (US)

(72) Inventors: David D Zhang, Wilmington, DE (US); Zhongyu Wang, Shanghai (CN)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 234 days.

(21) Appl. No.: 13/723,245

(22) Filed: Dec. 21, 2012

(65) Prior Publication Data

US 2013/0172484 A1    Jul. 4, 2013

(30) Foreign Application Priority Data

Dec. 29, 2011    (CN) .......................... 2011 1 0449574

(51) Int. Cl.
| | | |
|---|---|---|
| *C08L 77/06* | (2006.01) | |
| *C08L 51/06* | (2006.01) | |
| *C08L 71/00* | (2006.01) | |
| *C08L 77/12* | (2006.01) | |
| *C08L 71/02* | (2006.01) | |

(52) U.S. Cl.
CPC ................ *C08L 77/06* (2013.01); *C08L 51/06* (2013.01); *C08L 71/00* (2013.01); *C08L 71/02* (2013.01); *C08L 77/12* (2013.01); *C08L 2205/02* (2013.01); *C08L 2205/035* (2013.01)

(58) Field of Classification Search
USPC .................................................... 525/66, 69
See application file for complete search history.

(56) References Cited

U.S. PATENT DOCUMENTS

| 4,331,786 | A | 5/1982 | Foy et al. | |
|---|---|---|---|---|
| H916 | H | 5/1991 | Nishida | ........................... 525/66 |
| 5,712,043 | A | 1/1998 | Chen | ............................. 428/500 |
| 2004/0071913 | A1* | 4/2004 | Bellet | ........................ 428/36.91 |
| 2010/0140846 | A1 | 6/2010 | Montanari | ............... 264/331.19 |
| 2011/0105697 | A1 | 5/2011 | Buhler | .......................... 525/432 |

FOREIGN PATENT DOCUMENTS

| CN | 101501138 A | 8/2009 |
|---|---|---|
| CN | 102076770 A | 5/2011 |
| CN | 102079867 A | 6/2011 |
| WO | 2011066495 | 6/2011 |
| WO | WO 2011/066495 A1 | 6/2011 |

OTHER PUBLICATIONS

State Intellectual Property Office, People's Republic of China, First Office Action in Application No. 201110449574, Chinese counterpart of the present application, Beijing, CN, Oct. 8, 2014. [English translation was provided by applicant's Chinese patent agent.].

* cited by examiner

*Primary Examiner* — Jeffrey Mullis
(74) *Attorney, Agent, or Firm* — John H. Lamming

(57) ABSTRACT

Disclosed is a thermoplastic elastomer composition comprising (i) about 10-60 wt % of at least one aliphatic polyamide; (ii) about 0.8-15 wt % of at least one graft-modified ethylene-olefin elastomeric copolymer; (iii) about 0.8-15 wt % of at least one graft-modified ethylene-propylene elastomeric copolymer, and (iv) about 35-85 wt % of at least one polyether-ester-amide block copolymer having a shore D of about 50-60 (as measured in accordance with ASTM D2240), with the total wt % of all components in the composition totaling to 100 wt %. Further disclosed herein is an article made from the thermoplastic elastomer composition disclosed above.

20 Claims, 1 Drawing Sheet

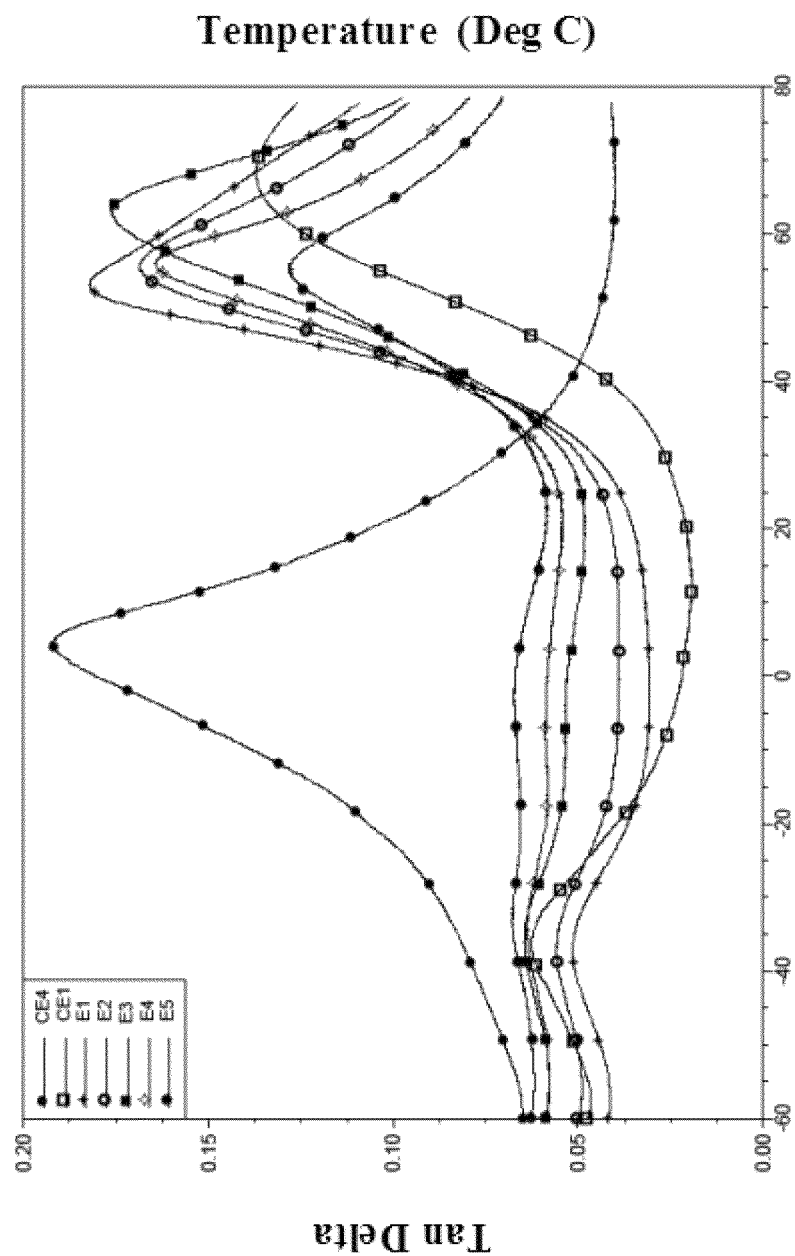

THERMOPLASTIC ELASTOMER COMPOSITIONS

CROSS REFERENCE TO RELATED APPLICATIONS

This application claims the benefit of Chinese Application No. 201110449574.3, filed Dec. 29, 2011, now pending, the entire disclosure of which is incorporated herein by reference.

The disclosure is related to a novel thermoplastic elastomer composition with improved wear resistance and energy return.

BACKGROUND OF THE INVENTION

Due to its wear resistance and low temperature flexibility, polyether-ester-amide block copolymers have been used in the manufacture of component parts of medical devices, sporting equipment, automobiles, mechanical tools, electronic products, and etc. For example, polyether-ester-amide block copolymers can be used as shoe sole materials in the sports shoe industry.

However, as polyether-ester-amide block copolymers are usually prepared by copolymerization in reactors, the use of polyether-ester-amide block copolymers is somewhat limited by the high production cost.

To address this problem, various kinds of modified polyamides have been developed to replace polyether-ester-amide block copolymers. For example, the present Applicant disclosed a polyamide alloy in China Patent Publication CN102079867A and PCT Patent Application Publication WO 2011066495. Specifically, the polyamide alloy comprises 50-80 wt % of at least one aliphatic polyamide and 20-50 weight % of a vinyl copolymer blend, wherein the vinyl copolymer blend comprises at least two of (i) graft-modified ethylene-olefin copolymer, (ii) graft-modified ethylene propylene rubber, and (iii) styrene rubber. However, although polyamide alloy as such disclosed has improved Akron wear resistance, when compared to polyether-ester amide block copolymers, there is still a need for further improvements.

SUMMARY OF THE INVENTION

A thermoplastic elastomer composition comprising or produced from (a) 10-50 wt % of at least one aliphatic polyamide; (b) 1-10 wt % of at least one graft-modified ethylene-olefin elastomeric copolymer; (c) 1-10 wt % of at least one graft-modified ethylene-propylene elastomeric copolymer; and (d) 35-85 wt % of at least one polyether-ester-amide block copolymer having a shore D of 50-60 (as measured in accordance with ASTM D2240), with the total wt % of all components in the composition totaling to 100 wt %.

The graft-modified ethylene-olefin elastomeric copolymer may be prepared by grafting one or more functional groups on the polymer chain of a base ethylene-olefin elastomeric copolymer, and preferably, the graft-modified ethylene-olefin elastomeric copolymer has a grafting degree (or containing the grafting comonomer) of 0.01-5 wt %, or 0.1-3 wt %, or 0.2-1 wt %. The base ethylene-olefin elastomeric copolymer may comprise 5-45 wt %, or 15-40 wt %, or 25-35 wt % of copolymerized units of one or more $C_{4-10}$ olefins, with the remainder being copolymerized units of ethylene and bringing the total amount of copolymerized units to 100 wt %, and the $C_{4-10}$ olefins may be selected from 1-butene, 1-pentene, 1-hexene, 1-heptene, 1-octene, 2-heptene, 2-butene, 2-octene, 2-hexene, and combinations of two or more thereof.

In a yet further embodiment of the thermoplastic elastomeric composition, the at least one graft-modified ethylene-olefin elastomeric copolymer is selected from maleic anhydride grafted ethylene-octene elastomeric copolymers.

The graft-modified ethylene-propylene elastomeric copolymer may be prepared by grafting one or more functional groups on the polymer chain of a base ethylene-propylene elastomeric copolymer, and preferably, the graft-modified ethylene-propylene elastomeric copolymer has a grafting degree of 0.01-5 wt %, or 0.1-3 wt %, or 0.2-1 wt %. The base ethylene-propylene elastomeric copolymer may comprise 20-60 wt %, or 22-55 wt %, or 25-55 wt % of copolymerized units of propylene, with the remainder being copolymerized units of ethylene and bringing the total amount of copolymerized units to 100 wt %, and the base ethylene-propylene elastomeric copolymer may further comprise 0-25 wt %, or about 0-20 wt %, or about 0-15 wt % copolymerized units of one or more $C_{5-10}$ non-conjugated dienes, with the total wt % of all copolymerized units in the base ethylene-propylene elastomeric copolymer totaling to 100 wt %.

The graft-modified ethylene-propylene elastomeric copolymer may be selected from maleic anhydride grafted EPDM rubbers.

The aliphatic polyamide may be selected from the group consisting of (i) polyamide 4,6; polyamide 6; polyamide 6,6; polyamide 6,10; polyamide 6,12; polyamide 6,13; polyamide 6,14; polyamide 6,15; polyamide 6,16; polyamide 9,10; polyamide 9,12; polyamide 9,13; polyamide 9,14; polyamide 9,15; polyamide 9,36; polyamide 10,10; polyamide 10,12; polyamide 10,13; polyamide 10,14; polyamide 11; polyamide 12; polyamide 12,10; polyamide 12,12; polyamide 12,13; polyamide 12,14; and combinations of two or more thereof, (ii) polyamide 10,10; polyamide 6,6; polyamide 6; and combinations of two or more thereof, or (iii) polyamide 10,10.

The at least one polyether-ester-amide block copolymer may have a formula as follows.

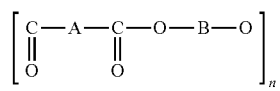

wherein (i) A is a linear saturated aliphatic polyamide sequence having an average molecular weight of 200 to 15,000 and formed from a lactam or an aminocarboxylic acid having a hydrocarbon chain containing 4-14 carbon atoms or from an aliphatic $C_6$-$C_{12}$ dicarboxylic acid and a $C_6$-$C_9$ diamine, in the presence of a chain-limiting aliphatic dicarboxylic acid having 4-20 carbon atoms; (ii) B is a polyoxyalkylene sequence formed from linear or branched aliphatic polyoxyalkylene glycols, mixtures thereof, or copolyethers derived therefrom, wherein the polyoxyalkylene glycols have a molecular weight of 200-6,000; and (iii) n indicates a sufficient number of repeating units so that the polyether-ester amide block copolymer has an intrinsic viscosity of 0.8-2.05.

The thermoplastic elastomer composition may be prepared by a melt blending process. The thermoplastic elastomer composition may have an Akron abrasion value of 0.018 or lower, as measured in accordance to JIS K6264-2.

Further disclosed herein is an article comprises or produced from the thermoplastic elastomer composition disclosed above. The article may be selected from the group consisting of component parts of shoes, medical devices, sporting equipment, automobiles, mechanical tools, and electronic products, and more preferably, the article is selected from shoe soles.

Disclosed herein, when a range is given with two particular end points, it is understood that the range includes any value that is within the two particular end points and any value that is equal to or about equal to any of the two end points.

BRIEF DESCRIPTION OF DRAWINGS

FIG. 1 shows the dynamic mechanical analysis (DMA) curve of the compositions in CE1-CE4 and E1-E5 measured over a temperature range from −60° C. to 80° C.

DETAILED DESCRIPTION OF THE INVENTION

The term "aliphatic polyamide", as used herein, refers to those polyamides containing no aromatic ring in their molecular chains. Suitable aliphatic polyamides may be selected from, condensation products of one or more aminocarboxylic acids, condensation products of one or more lactams, condensation product of one or more aminocarboxylic acids with one or more lactams, condensation products of one or more diamines with one or more dicarboxylic acids or salts thereof, or combinations of two or more thereof.

The aminocarboxylic acids may have 6 to 12 carbon atoms, which may include, without limitation, 6-aminocapronic acid, 7-aminoheptanoic acid, 9-aminononanoic acid, 11-aminoundecanoic acid, 12-aminododecanoic acid, combinations of two or more thereof, and the like.

The lactams may have 4 to 12 carbon atoms, which may include, without limitation, α-pyrrolidone, ε-caprolactam, ω-laurolactam, ε-enantholactam, combinations of two or more thereof, and the like.

The diamines may include, without limitation, tetramethylenediamine; hexamethylenediamine; 2-methylpentamethylenediamine; nonamethylenediamine; undecamethylenediamine; dodeca-methylenediamine; 2,2,4-trimethylhexamethylenediamine; 2,4,4-trimethylhexamethylenediamine; 5-methylnonamethylenediamine; 1,3-bis(aminomethyl)cyclohexane; 1,4-bis(aminomethyl)cyclohexane; 1-amino-3 aminomethyl-3,5,5-trimethylcyclohexane; bis(4-aminocyclohexyl)methane; bis(3-methyl-4-aminocyclohexyl)methane; 2,2-bis(4-aminocyclohexyl)propane; bis(aminopropyl)piperazine; aminoethylpiperazine; bis(p-aminocyclohexyl)methane; 2-methyloctamethylenediamine; trimethylhexamethylenediamine; 1,8-diaminooctane; 1,9-diaminononane; 1,10-diaminodecane; 1,12-diaminododecane; and m-xylylenediamine, combinations of two or more thereof, and the like.

The dicarboxylic acid may be aliphatic or alicyclic dicarboxylic acids, which may include, without limitation, adipic acid, glutaric acid, pimelic acid, suberic acid, azelaic acid, sebacic acid, dodecanedioic acid, 1,4-cyclohexanedicarboxylic acid, combinations of two or more thereof, and the like.

Moreover, the aliphatic polyamide may have (a) a number average molar mass Mn of about 12000 or more or about 15000-50000, and/or (b) a weight average molar mass Mw of about 24000 or more or about 30000-100000, and/or (c) an inherent viscosity of about 0.9 or more (measured in accordance to ISO 1628-1 at 25° C.).

Exemplary aliphatic polyamides may include, without limitation, polyamide 4,6; polyamide 6; polyamide 6,6; polyamide 6,10; polyamide 6,12; polyamide 6,13; polyamide 6,14; polyamide 6,15; polyamide 6,16; polyamide 9,10; polyamide 9,12; polyamide 9,13; polyamide 9,14; polyamide 9,15; polyamide 9,36; polyamide 10,10; polyamide 10,12; polyamide 10,13; polyamide 10,14; polyamide 11; polyamide 12; polyamide 12,10; polyamide 12,12; polyamide 12,13; polyamide 12,14; and combinations of two or more thereof. In one embodiment, the aliphatic polyamides used herein are selected from polyamide 10,10; polyamide 6,6; polyamide 6; or combinations of two or more thereof. In a further embodiment, the polyamides may be selected from polyamide 10,10.

Polyamides may also be obtained commercially. For example, commercially available polyamides include, without limitation, those available from E.I. du Pont de Nemours and Company (U.S.A.) (hereafter "DuPont") under the trade names ZYTEL® or HEROX® (such as ZYTEL® 7301 NC 010 polyamide 6 resin; ZYTEL® 101 NC 010 polyamide 6,6 resin; or HEROX® PA1010-12 resins) or from Ube Industries (Japan) under trade name UBE 1015B.

A "graft-modified" polymer or copolymer may refer to a modified polymer or copolymer that is derived from certain base polymer or copolymer by grafting one or more functional groups on the polymer chain of the base polymer or copolymer. Suitable functional groups may be selected from acids, acid anhydrides, epoxy groups, and combinations of two or more thereof. Some non-limiting examples of the functional groups useful herein include, glycidyl methacrylate; methacrylic acid; methacrylic anhydride; maleic acid; maleic anhydride; fumaric acid; itaconic acid; citric acid; allyl succinic acid; cyclohex-4-ene-1,2-dicarboxylic acid; 4-methyl-cyclohex-4-ene-1,2-dicarboxylic acid; bicycle[2.2.1]hept-5-ene-2,3-dicarboxylic acid; x-methyl-bicyclo(2.2.1)-hept-5-ene-2,3-dicarboxylic acid; itaconic anhydride; citric anhydride; allyl succinic anhydride; cyclohex-4-ene-1,2-dicarboxylic anhydride; 4-methyl-cyclohex-4-ene-1,2-dicarboxylic anhydride; bicycle[2.2.1]hept-5-ene-2,3-dicarboxylic anhydride; x-methyl-bicycle[2.2.1]hept-5-ene-2,3-dicarboxylic anhydride; and combinations of two or more thereof.

A graft-modified polymer or copolymer may have a grafting degree of about 0.01-5 wt %, or about 0.1-3 wt %, or about 0.2-1 wt %, which means that about 0.01-5 wt %, or about 0.1-3 wt %, or about 0.2-1 wt % of the one or more functional groups is contained in the graft-modified polymer or copolymer, all wt % are based on the total weight of the graft-modified polymer or copolymer.

Any suitable methods known to one skilled in the art can be used to prepare graft-modified polymers or copolymers. For example, a particular graft-modified polymer or copolymer may be prepared by first mixing the corresponding base polymer or copolymer with any one or two of the above mentioned functional groups and then heating the mixture (e.g., to about 150° C.-300° C.). Solvents and/or free radical initiators also may be used in the grating process.

The graft-modified ethylene-olefin elastomeric copolymers may be those derived from elastomer type or rubber type ethylene-olefin copolymers (simplified as ethylene-olefin elastomeric copolymers hereafter). The ethylene-olefin elastomeric copolymers may comprise about 5-45 wt %, or about 15-40 wt %, or about 25-35 wt % of copolymerized units of one or more $C_{4-10}$ olefins, the remainder being copolymerized units of ethylene and bringing the total amount of copolymerized units to 100 wt %. Suitable non-limiting examples of $C_{4-10}$ olefins may include $C_{4-10}$ α-olefins (such as 1-butene, 1-pentene, 1-hexene, 1-heptene and 1-octene) and other olefins (such as 2-heptene, 2-butene, 2-octene and 2-hexene). The ethylene-olefin elastomeric copolymers used herein, on the premise of without changing their properties, may further comprise copolymerized units of one or more additional monomers other than ethylene and $C_{4-10}$ olefins. The ethylene-olefin elastomeric copolymers may also be ethylene-octene elastomeric copolymers having a Mooney viscosity of about 16-24 (as measured in accordance with ASTM D1646). The graft-modified ethylene-olefin elastomeric copolymers may be selected from maleic anhydride grafted ethylene-octene elastomeric copolymers, such as those commercially available from DuPont under the trade name FUSABOND® N493 or from Dow Chemical (U.S.A.) under the trade name AMPLIFY™ GR216.

The graft-modified ethylene-propylene elastomeric copolymers may be those derived from ethylene-propylene elastomeric copolymers comprising about 20-60 wt %, or about 22-55 wt %, or about 25-55 wt % of copolymerized units of propylene, the remainder being copolymerized units of ethylene and bringing the total amount of copolymerized units to 100 wt %. The ethylene-propylene elastomeric copolymers used herein, on the premise of without changing their properties, may further comprise copolymerized units of one or more monomers other than ethylene and propylene. The ethylene-propylene elastomeric copolymers may further comprise copolymerized units of one or more $C_{5-10}$ non-conjugated dienes. Suitable non-limiting examples of the $C_{5-10}$ non-conjugated dienes used herein include, 1,4-pentadiene; 1,4-hexadiene; 1,5-hexadiene; 1,4-heptadiene; 1,5-heptadiene; 1,4-octadiene; 1,5-octadiene; etc. The ethylene-propylene elastomeric copolymers may be di-polymers comprising copolymerized units of ethylene and propylene. The ethylene-propylene elastomeric copolymers may be ter-polymers comprising copolymerized units of ethylene, propylene, and a $C_{5-10}$ non-conjugated diene monomer. In such embodiments, the ethylene-propylene elastomeric copolymers may comprising about 20-60 wt %, or about 22-55 wt %, or about 25-55 wt % of copolymerized units of propylene and about 0-25 wt %, or about 0-20 wt %, or about 0-15 wt % of copolymerized units of the $C_{5-10}$ non-conjugated diene, with the remainder being copolymerized units of ethylene and bringing the total amount of copolymerized units to 100 wt %. The ethylene-propylene elastomeric copolymers may also be ethylene-propylene-$C_{5-10}$ non-conjugated diene ter-polymers (also known as ethylene propylene diene monomer rubber (EPDM rubber)). A preferred EPDM rubber may comprise about 65-75 wt % of copolymerized units of ethylene and has a Mooney viscosity of about 17.5-22.4 (as measured in accordance to ASTM D1646). The graft-modified ethylene-propylene elastomeric copolymers may be selected from maleic anhydride grafted ethylene-propylene elastomeric copolymers, or preferably maleic anhydride grafted EPDM rubbers, such as those commercially available from DuPont under the trade name FUSABOND® N416 or from Kumho Polychem (Korea) under the trade name KEPA 1150.

The polyether-ester-amide block copolymers may have a shore D of about 50-60 (as measured in accordance to ASTM D2240) and may have a formula as follows.

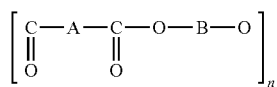

wherein (i) A is a linear saturated aliphatic polyamide sequence having an average molecular weight of about 200-15,000 and formed from a lactam or an aminocarboxylic acid having a hydrocarbon chain containing 4-14 carbon atoms or from an aliphatic $C_6$-$C_{12}$ dicarboxylic acid and a $C_6$-$C_9$ diamine, in the presence of a chain-limiting aliphatic dicarboxylic acid having 4-20 carbon atoms; (ii) B is a polyoxyalkylene sequence formed from linear or branched aliphatic polyoxyalkylene glycols, mixtures thereof, or copolyethers derived therefrom, wherein the polyoxyalkylene glycols have a molecular weight of about 200-6,000; and (iii) n indicates a sufficient number of repeating units so that the polyether-ester amide block copolymer has an intrinsic viscosity of about 0.8-2.05.

The polyether-ester-amide block copolymers may be prepared by any suitable process known in the art, such as those disclosed in US4331786. Commercially available polyether-ester-amide clock copolymers may include, without limitation, PEBAX™ polyether block amides (available from Arkema Group (France)); VESTAMID™ E series resins (available from Evonik Industries (Germany)); and UBESTA™ XPA series resins (available from Ube America, USA).

The thermoplastic elastomer compositions may also comprise one or more suitable additives. Exemplary additives may include, without limitation, heat stabilizers, UV absorbers, nucleating agents, antistatic agents, lubricants, flame retardants, colorants, pigments, brightening agents, antioxidants, inorganic fillers, plasticizers, and combinations of two or more thereof. There amount of additives that could be added in the composition may be from 0.0001 to about 10 weight %, provided that the desirable properties of the composition are maintained. For example, based on the total weight of the thermoplastic elastomer composition, up to about 5 wt %, or about 0.1-3 wt %, or about 0.5-2.5 wt % of the additives may be present in the composition.

The thermoplastic elastomer compositions may be prepared by any suitable process known in the art. For example, the thermoplastic elastomer composition may be prepared by any suitable melt or dry blending process. Preferably, the thermoplastic elastomer composition may be prepared by a melt blending process (e.g., at a temperature of about 240° C.-260° C.) using an extruder, a mixer, or a mixing mill. The thermoplastic elastomer compositions may be obtained by a one-step melt blending process, wherein all the polymer components and additives are first mixed together and then melt blended. Alternatively, thermoplastic elastomer compositions may be obtained by a multi-step melt blending process, wherein two of more of the polymer components are melt blended first, which is then further melt blended with the remaining polymer components, while the additives might be added during any one or more of the multiple blending steps. For example, the composition may be prepared by first melt blending the at least one aliphatic polyamide, the ethylene-olefin elastomeric copolymer, and the ethylene-propylene elastomeric copolymer, which may be then further melt blended with the polyether-ester-amide block copolymer.

As demonstrated by the examples below, the thermoplastic elastomer composition has improved Akron wear resistance, compared to both the prior art polyether-ester-amide block copolymers or the polyamide alloy disclosed in China Patent Application Publication CN102079867A and PCT Patent Application Publication WO 2011066495. Moreover, the energy return property of the thermoplastic elastomer composition is also good and comparable to the prior art polyamide alloy.

The thermoplastic elastomer composition may have an Akron abrasion value of 0.018 or lower, as measured in accordance to JIS K6264-2.

Further disclosed herein are articles made from or comprising the thermoplastic elastomer compositions disclosed hereinabove. Suitable articles may include, without limitation, component parts of shoes, medical devices, sporting equipment, automobiles, mechanical tools, electronic products, and etc. For example, the articles may be molded articles, such as shoe soles made from or comprising the thermoplastic elastomer compositions disclosed herein.

EXAMPLES

Materials

PA1010—polyamide 10,10 having a density of 1.04 g/cc and a melting temperature of 205° C., which was obtained from DuPont under the trade name HEROX® PA1010-12;

MAH-g-POE—a maleic anhydride grafted ethylene-olefin elastomeric copolymer having a melt flow rate (MFR) of 1.6 g/10 min (determined in accordance with ASTM 1238 at 190° C. and 2.16 kg) and a density of 0.87 g/cc (determined in accordance with ASTM D792), which was obtained from DuPont under the trade name FUSA-BOND® N493;

MAH-g-EPR—a maleic anhydride grafted ethylene propylene elastomeric copolymer having a MFR of 23 g/10 min and a density of 0.87 g/cc;

TPEA—a polyether-ester-amide block copolymer having a density of 1 g/cc (determined in accordance with ISO 1183), and a hardness of 55 (determined in accordance with ISO 868), which was obtained from Arkema under the trade name PEBAX™ 5533;

PMB—a blend master batch comprising 75 wt % of PA1010, 15 wt % of MAH-g-POE, and 10 wt % of MAH-g-EPR, which was produced by melt blending the three (3) components using a 37 mm twin screw extruder with the temperature set at 250° C. and screw speed at 325 rpm.

Test Methods:

The Shore D measurement of the blend composition was determined in accordance with ASTM D2240.

The tear strength (Kg/cm) measurement of the blend composition was determined in accordance with ASTM D624.

The Akron abrasion tests were conducted following the procedure described in JIS K6264-2 (Rubber, vulcanized or thermoplastic—Determination of abrasion resistance—Part 2). Briefly, the procedure included, preparing a test specimen having a size of 364×12.7×2 mm; attaching the test specimen to a rubber wheel with a diameter of 62 mm; contacting the rubber wheel with an abrasion wheel at a 15 degree angle; rotating the abrasion wheel 3000 times; and then checking the volume loss of the test specimen.

The Ross flex tests were conducted as follows. First, a test specimen that was 2.5 cm wide, 15 cm long, and 2 mm thick was prepared. Then, a slit cut (2.5 mm long and perpendicular to the length of the specimen) was made in the middle of the test specimen. The test specimen was mounted on a Ross flex tester (GT-7006-V30 Vertical Type Freezing Tester manufactured by GoTech (Taiwan)) with the bending point located at the slit cut. After half hour of conditioning in −6° C., and 150,000 flex cycles, the test specimen was examined for any changes in the hole size. If there was no change in the hole size, the test results would be recorded as "pass". Otherwise, the final cut length would be recorded.

Comparative Examples CE1-CE4 and Examples E1-E5

In each of CE2-CE3 and E1-E5, a blend composition of PMB and TPEA (ratio listed in Table 1) was prepared by a melt blending process similar to those described above in preparing the PMB blending master batch. Then, the compositions used in each of CE1-CE4 and E1-E5 were injection molded using a 100 ton injection molding machine (manufactured by Sumitomo Plastics Machinery) to prepare the various test specimen and the Shore D measurement, the tear strength measurement, the Akron abrasion measurement, and the Ross flex measurement thereof were determined and recorded in Table 1.

As shown herein, the Akron abrasion lost for PMB was measured at 0.0200 (CE1) while the Akron abrasion lost for TPEA was measured at 0.0310 (CE4). However, by melt blending PMB and TPEA at certain ratios (E1-E5), the Akron abrasion lost thereof was measured at 0.0147-0.0180, a 10-26% reduction compared to PMB, or a 42-53% reduction compared to TPEA.

The blend compositions in CE1-CE4 and E1-E5 were subjected to dynamic mechanical analysis (DMA) using a DMA Q800 machine (manufactured by TA Instruments (USA)) in a dual cantilever ode over a temperature range from −60° C. to 80° C. The tangent delta (Tan Delta) curves of the samples are shown in FIG. 1. Tan Delta is a ratio of loss modulus and storage modulus. Therefore, for a test specimen, the lower the Tan Delta is, the lower the energy loss is, and the higher the energy return is. As shown in FIG. 1, the blend composition of the present disclosure (E1-E5) all had higher energy return compared to TPEA (CE4).

TABLE 1

| Samples | PMB/TPEA Ratio (by wt) | Akron Abrasion | Shore D | Tear Strength (Kg/cm) | Ross Flex |
|---|---|---|---|---|---|
| CE1 | 100/0 | 0.0200 | 69.7 | 225.64 | 3.7 |
| CE2 | 80/20 | 0.0338 | 67.2 | 195.18 | Pass |
| CE3 | 70/30 | 0.0227 | 65.8 | 181.72 | Pass |
| E1 | 60/40 | 0.0180 | 63.4 | 174.77 | Pass |
| E2 | 50/50 | 0.0151 | 62.2 | 176.71 | Pass |
| E3 | 40/60 | 0.0174 | 60.7 | 167.21 | Pass |
| E4 | 30/70 | 0.0147 | 59.0 | 171.18 | Pass |
| E5 | 20/80 | 0.0175 | 57.6 | 171.85 | Pass |
| CE4 | 0/100 | 0.0310 | 54.9 | 166.22 | Pass |

Comparative Examples CE5-CE6 and Examples E6-E10

In each of CE5-CE6 and E6-E10, a blend composition of PMB and TPEA (ratio listed in Table 1) was prepared by a dry blending process. Briefly, in the dry blending process, all components in the blends were mixed together for 5 minutes at room temperature using a Superfloat mixer (model number SPC-50 manufactured by Kawata MFG Co., Ltd. (Japan). Then, similarly to the above, Shore D measurement, the tear strength measurement, the Akron abrasion measurement, and the Ross flex measurement of the blend compositions used in CE5-CE6 and E6-E10 were determined and recorded in Table 2.

It is shown here that by blending PMB and TPEA at certain ratios (E6-E10), the Akron abrasion lost thereof was comparable to PMB. However, the Akron abrasion lost of the blends in E6-E10 was reduced by 30-40% compared to TPEA.

TABLE 2

| Samples | PMB/TPEA Ratio (by wt) | Akron Abrasion | Shore D | Tear Strength (Kg/cm) |
|---|---|---|---|---|
| CE5 | 80/20 | 0.0203 | 66.4 | 201.33 |
| CE6 | 70/30 | 0.0232 | 65.1 | 184.35 |

TABLE 2-continued

| Samples | PMB/TPEA Ratio (by wt) | Akron Abrasion | Shore D | Tear Strength (Kg/cm) |
|---|---|---|---|---|
| E6 | 60/40 | 0.0217 | 64.1 | 179.36 |
| E7 | 50/50 | 0.0194 | 62.3 | 167.19 |
| E8 | 40/60 | 0.0200 | 60.5 | 163.51 |
| E9 | 30/70 | 0.0178 | 58.6 | 162.68 |
| E10 | 20/80 | 0.0215 | 57.5 | 161.16 |

The invention claimed is:

1. A thermoplastic elastomer composition comprising 10-50 wt % of at least one aliphatic polyamide; 1-10 wt % of at least one graft-modified ethylene-olefin elastomeric copolymer; 1-10 wt % of at least one graft-modified ethylene-propylene elastomeric copolymer; and 40-80 wt % of at least one polyether-ester-amide block copolymer (TPEA) having a shore D of 50-60 (as measured in accordance with ASTM D2240), with the total weight percent of all components in the composition totaling 100%, wherein graft modified ethylene-olefin elastomeric copolymer and graft-modified ethylene propylene elastomeric copolymer are different from each other wherein the composition has a higher abrasion resistance than both of the polyether-ester-amide block copolymer as well as a composition formed by melt blending the two graft-modified copolymers and polyamide in the amounts present in the composition.

2. The composition of claim 1 wherein the graft-modified ethylene-olefin elastomeric copolymer comprises one or more functional groups and has a grafting degree of 0.01 to 5 wt %.

3. The composition of claim 2 wherein the graft-modified ethylene-olefin elastomeric copolymer has a grafting degree of 0.1 to 3 wt %.

4. The composition of claim 3 wherein the ethylene-olefin elastomeric copolymer comprises 5 to 45 wt % of copolymerized units of $C_{4-10}$ olefin selected from the group consisting of 1-butene, 1-pentene, 1-hexene, 1-heptene, 1-octene, 2-heptene, 2-butene, 2-octene, 2-hexene, and combinations of two or more thereof; the remainder is copolymerized units of ethylene; and the total amount of copolymerized units is 100 wt %.

5. The composition of claim 4 wherein the graft-modified ethylene-olefin elastomeric copolymer comprises has a grafting degree of 0.2 to 1 wt %.

6. The composition of claim 5 wherein the graft-modified ethylene-olefin elastomeric copolymer is a maleic anhydride grafted ethylene-octene elastomeric copolymer.

7. The composition of claim 3 wherein the ethylene-propylene elastomeric copolymer comprises 20 to 60 wt % of copolymerized units of propylene; the remainder is copolymerized units of ethylene; and the total amount of copolymerized units is 100 wt %.

8. The composition of claim 7 wherein the graft-modified ethylene-olefin elastomeric copolymer is a maleic anhydride grafted ethylene-octene elastomeric copolymer; and the ethylene-propylene elastomeric copolymer comprises 25 to 55 wt % of copolymerized units of propylene.

9. The composition of claim 7 wherein the ethylene-propylene elastomeric copolymer further comprises 0 to 25 wt % of copolymerized units of a $C_{5-10}$ non-conjugated diene.

10. The composition of claim 9 wherein the ethylene-propylene elastomeric copolymer further comprises 0 to 15 wt % copolymerized units of the $C_{5-10}$ non-conjugated diene.

11. The composition of claim 10 wherein the graft-modified ethylene-propylene elastomeric copolymer is a maleic anhydride grafted EPDM rubber.

12. The composition of claim 4 wherein the aliphatic polyamide is selected from the group consisting of polyamide 4,6; polyamide 6; polyamide 6,6; polyamide 6,10; polyamide 6,12; polyamide 6,13; polyamide 6,14; polyamide 6,15; polyamide 6,16; polyamide 9,10; polyamide 9,12; polyamide 9,13; polyamide 9,14; polyamide 9,15; polyamide 9,36; polyamide 10,10; polyamide 10,12; polyamide 10,13; polyamide 10,14; polyamide 11; polyamide 12; polyamide 12,10; polyamide 12,12; polyamide 12,13; polyamide 12,14; and combinations of two or more thereof, or (ii) selected from the group consisting of polyamide 10,10; polyamide 6,6; polyamide 6; and combinations of two or more thereof, or (iii) selected from polyamide 10,10.

13. The composition of claim 7 wherein the aliphatic polyamide is selected from the group consisting of polyamide 10,10; polyamide 6,6; polyamide 6; and combinations of two or more thereof.

14. The composition of claim 11 wherein the aliphatic polyamide is polyamide 10,10.

15. The composition of claim 8 wherein the polyether-ester-amide block copolymer is

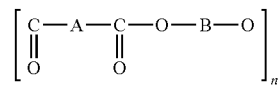

wherein A is a linear saturated aliphatic polyamide sequence having an average molecular weight of 200-15,000 and comprises or is produced from (1) a lactam or an aminocarboxylic acid having a hydrocarbon chain containing 4-14 carbon atoms or (2) an aliphatic $C_6$-$C_{12}$ dicarboxylic acid and a $C_6$-$C_9$ diamine, in the presence of a chain-limiting aliphatic dicarboxylic acid having 4-20 carbon atoms; B is a polyoxyalkylene sequence comprising or produced from a linear or branched aliphatic polyoxyalkylene glycol or a copolyether derived therefrom; and n is such a number that the block copolymer has an intrinsic viscosity of 0.8-2.05, as measured in accordance with ISO 1628-1 at 25° C.

16. The composition of claim 15 wherein the aliphatic polyamide is selected from the group consisting of polyamide 10,10; polyamide 6,6; polyamide 6; and combinations of two or more thereof.

17. The composition of claim 15 wherein the aliphatic polyamide is polyamide 10,10.

18. An article comprising a thermoplastic elastomer composition as recited in claim 1 and the article is a component part of shoes, medical devices, sporting equipment, automobiles, mechanical tools, or electronic products.

19. The article of claim 18 wherein the article is the component part of the shoe.

20. A process for preparing a thermoplastic elastomer composition of claim 1 comprising melt blending a graft-modified ethylene-olefin elastomeric copolymer, a graft-modified ethylene-propylene elastomeric copolymer, and a polyether-ester-amide block copolymer wherein each of the graft-modified ethylene-olefin elastomeric copolymer, a graft-modified ethylene-propylene elastomeric copolymer, and a polyether-ester-amide block copolymer has a grafting degree of 0.01 to 5 wt %.

* * * * *